(12) United States Patent
Borowski et al.

(10) Patent No.: US 10,697,369 B2
(45) Date of Patent: Jun. 30, 2020

(54) METHOD FOR SHUTTING DOWN A GAS TURBINE AND A STEAM TURBINE OF A COMBINED CYCLE POWER PLANT AT THE SAME TIME

(71) Applicant: Siemens Aktiengesellschaft, Munich (DE)

(72) Inventors: Marc Borowski, Moers (DE); Edwin Gobrecht, Ratingen (DE); Matthias Heue, Bochum (DE); Matthias Migl, Munich (DE); Erich Schmid, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/346,328

(22) PCT Filed: Oct. 11, 2017

(86) PCT No.: PCT/EP2017/075920
§ 371 (c)(1),
(2) Date: Apr. 30, 2019

(87) PCT Pub. No.: WO2018/082879
PCT Pub. Date: May 11, 2018

(65) Prior Publication Data
US 2019/0338703 A1 Nov. 7, 2019

(30) Foreign Application Priority Data
Nov. 7, 2016 (EP) ...................................... 16197458

(51) Int. Cl.
*F01D 13/00* (2006.01)
*F02C 6/04* (2006.01)
(Continued)

(52) U.S. Cl.
CPC ................ *F02C 6/04* (2013.01); *F01D 13/00* (2013.01); *F01D 21/12* (2013.01); *F01K 13/02* (2013.01);
(Continued)

(58) Field of Classification Search
CPC .......... F01K 13/02; F01K 23/101; F01K 3/22; F01K 23/10; F01D 21/00; Y02E 20/16; F02C 6/18
See application file for complete search history.

(56) References Cited

U.S. PATENT DOCUMENTS 4,028,884 A * 6/1977 Martz ................... F01K 23/108
60/39.182
4,205,380 A * 5/1980 Braytenbah ............. F01D 17/00
290/40 R
(Continued)

FOREIGN PATENT DOCUMENTS

EP 1275817 A1 1/2003
EP 2022945 A1 2/2009
(Continued)

OTHER PUBLICATIONS

International search report and written opinion dated Jan. 3, 2018, for corresponding PCT/EP2017/075920.
(Continued)

*Primary Examiner* — Scott J Walthour
*Assistant Examiner* — Todd N Jordan
(74) *Attorney, Agent, or Firm* — Beusse Wolter Sanks & Maire

(57) ABSTRACT

A method for operating a combined cycle power plant, wherein the combined cycle power plant has a gas turbine and a steam turbine and also a shutting-down device, and wherein, for shutting down the gas turbine and the steam turbine, the gas turbine and the steam turbine are operated
(Continued)

within a time window that extends from the beginning of the shutting-down procedure at a first time to the falling of the steam temperature to a lower limit value at a second time by the shutting device in such a way that the gas turbine and the steam turbine are relieved substantially at the same time and the block power falls to zero, thermal energy that is stored in the combined cycle power plant preventing immediate falling of a steam temperature to operation below a minimum power output of the gas turbine within the time window.

1 Claim, 3 Drawing Sheets

(51) Int. Cl.
  *F01D 21/12* (2006.01)
  *F02C 9/00* (2006.01)
  *F01K 13/02* (2006.01)
(52) U.S. Cl.
  CPC ............ *F02C 9/00* (2013.01); *F05D 2270/11* (2013.01); *Y02E 20/16* (2013.01)

(56) References Cited

U.S. PATENT DOCUMENTS

| | | | | |
|---|---|---|---|---|
| 5,301,499 | A * | 4/1994 | Kure-Jensen | F01K 23/108 60/773 |
| 6,679,046 | B2 | 1/2004 | Tanaka et al. | |
| 9,631,521 | B2 * | 4/2017 | Olia | F01K 23/10 |
| 10,436,058 | B2 * | 10/2019 | Bennauer | F01D 21/003 |
| 2013/0104561 | A1 * | 5/2013 | Varillas | F01D 21/14 60/773 |

FOREIGN PATENT DOCUMENTS

EP 2664749 A1 11/2013
EP 2775106 A1 9/2014

OTHER PUBLICATIONS

International PCT IPER dated Oct. 17, 2018, for corresponding PCT/EP2017/075920.

* cited by examiner

METHOD FOR SHUTTING DOWN A GAS TURBINE AND A STEAM TURBINE OF A COMBINED CYCLE POWER PLANT AT THE SAME TIME

CROSS REFERENCE TO RELATED APPLICATIONS

This application is the US National Stage of International Application No. PCT/EP2017/075920 filed Oct. 11, 2017, and claims the benefit thereof. The International Application claims the benefit of European Application No. EP16197458 filed Nov. 7, 2016. All of the applications are incorporated by reference herein in their entirety.

FIELD OF INVENTION

The invention relates to a method for operating a combined cycle power plant.

BACKGROUND OF INVENTION

A combined cycle power plant is understood here as meaning a combined cycle gas and steam power plant or a gas and steam turbine power plant, which combines the principles of a gas turbine power plant and a steam turbine power plant. A gas turbine serves in this case as a heat source for a downstream boiler, which in turn acts as a steam generator for the steam turbine.

With this combination, a greater efficiency is achieved in the thermodynamic cycle than with gas turbines in open operation or in conventionally fired steam power plants. With electrical efficiencies of up to 60%, combined power plants are among the most efficient conventional power plants.

Furthermore, such combined power plants can be used very flexibly in power plant management. On account of short start-up times and the possibility of quick load changes, they are ideal mid-load power plants. These power plants are primarily operated in the mid-load range and, if need be, even in the range of peak current.

However, below a minimum power output, the gas turbine does not have a constant exhaust-gas temperature. When shutting down the gas turbine, this also leads to a falling of the steam temperature. If the steam turbine then continues to be operated, this leads to a high lifetime consumption or shortening of the lifetime.

Therefore, in conventional combined cycle power plants, the steam turbine is shut down before the gas turbine is brought into the lower load range. For the time period of the steam turbine shutting-down procedure, the gas turbine must stay at a constant power level. This leads to a comparatively long shutting-down process—in comparison with starting up. During shutting down, the efficiency is often not optimal.

EP 2 775 106 A1 discloses a method for operating a combined cycle power plant with a gas turbine and a steam turbine for operating with a minimal load. With respect to shutting down, EP 2 775 106 A1 proposes that a de-loading of the steam turbine and a reducing of the steam pressure are chosen in such a way that a minimal steam turbine load and a minimal steam pressure are reached before a reducing of the steam temperature, caused by a reducing of the gas turbine exhaust-gas temperature during the de-loading of the gas turbine.

EP 2 664 749 A1 also discloses a combined cycle power plant. A controller is provided, producing a flow of steam through a heat recovery device after shutting down.

EP 1 275 817 A1 also discloses a combined cycle power plant that has, along with a gas turbine and a steam turbine, an emergency shut-off oil system, which can stop just the steam turbine or alternatively, in the event of a technical defect, also the gas turbine.

There is therefore a need at least to demonstrate a way in which the shutting down can be sped up.

SUMMARY OF INVENTION

According to the invention, in the case of a method for operating a combined cycle power plant with a gas turbine and a steam turbine and also a shutting-down device, the gas turbine and the steam turbine are operated by means of the shutting-down device in such a way that the gas turbine and the steam turbine are shut down substantially at the same time, within a time window that extends from the beginning of the shutting-down procedure at a first time to the falling of the steam temperature to a lower limit value at a second time, when the output power falls to zero. Thermal energy that is stored in the combined cycle power plant prevents immediate falling of a steam temperature to operation below a minimum power output of the gas turbine within the time window.

The invention makes use here of the fact that thermal capacities of the combined cycle power plant, such as for example steam and gas circulated in the pipeline system, but also in the walls of pipelines that connect components of the combined cycle power plant to one another, are sufficient to prevent a rapid temperature fall when the gas turbine is shut down. In other words, the thermal energy stored in the combined cycle power plant prevents immediate falling of the steam temperature during operation below the minimum power output of the gas turbine. Thus, within this time window that extends from the beginning of the shutting-down procedure to the fall of the steam turbine to a lower limit value, the gas turbine is shut down at the same time as the steam turbine. This allows the shutting down to be sped up. It is of advantage here, but not a prerequisite, that the gas turbine has high dynamics.

Preferably, the gas turbine is assigned a gas-turbine power controller and the steam turbine is assigned a steam-turbine power controller, and the gas-turbine power controller and the steam-turbine power controller are given the specified respective setpoint value with a respective shutting-down setpoint-value profile, in order that the gas turbine and the steam turbine are shut down substantially at the same time. In this case, substantially at the same time is understood as meaning that operation of the steam turbine does not lead to any damage and/or shortening of the lifetime. Therefore, for the shutting down, the gas-turbine power controller and the steam-turbine power controller are given specified setpoint values deviating from normal operation. The setpoint values may be in each case a series of values of decreasing magnitude that are coordinated with one another and fed forward to the respective controller (e.g. one setpoint value after the other) after a respective predetermined time period has elapsed. The respective controllers then bring about a correction of the respective actual value in a way corresponding to the respective setpoint values.

Preferably, the gas turbine is assigned a gas-turbine power controller and the steam turbine is assigned a steam-turbine power controller, and the respective manipulated variable of the gas-turbine power controller and of the steam-turbine power controller is respectively subjected to a shutting-down pre-control profile, in order that the gas turbine and the steam turbine are shut down substantially at the same time.

The shutting-down pre-control profile may comprise in each case a series of values of decreasing magnitude that are coordinated with one another and fed forward to the respective controller (e.g. one value after the other) after a respective predetermined time period has elapsed. A pre-control may also be used during the shutting down. The pre-control has the effect that the respective manipulated variable is additionally subjected to a value that is independent of the states of the controlled system. The pre-control makes it possible in an easy way to take into account the manipulated variable requirement to be expected on the basis of the setpoint value profile. Since it is an additional control, it does not put the stability of the controlled system at risk.

By suitable conversion of the setpoint variable to the pre-controlled manipulated variable, a dynamic control without adverse effects on the stability of the control circuit can be set up. The conversion of the setpoint variable to the manipulated variable takes place in such a way that a successive series of decreasing setpoint values results in a series of successive manipulated variables.

The invention also comprises a computer program product for carrying out such a method, comprises such a combined cycle power plant and comprises a shutting-down device for such a combined cycle power plant.

BRIEF DESCRIPTION OF THE DRAWINGS

An advantageous embodiment of the connecting element according to the invention is explained below on the basis of the accompanying schematic drawings, in which.

DETAILED DESCRIPTION OF INVENTION

Figure 1:
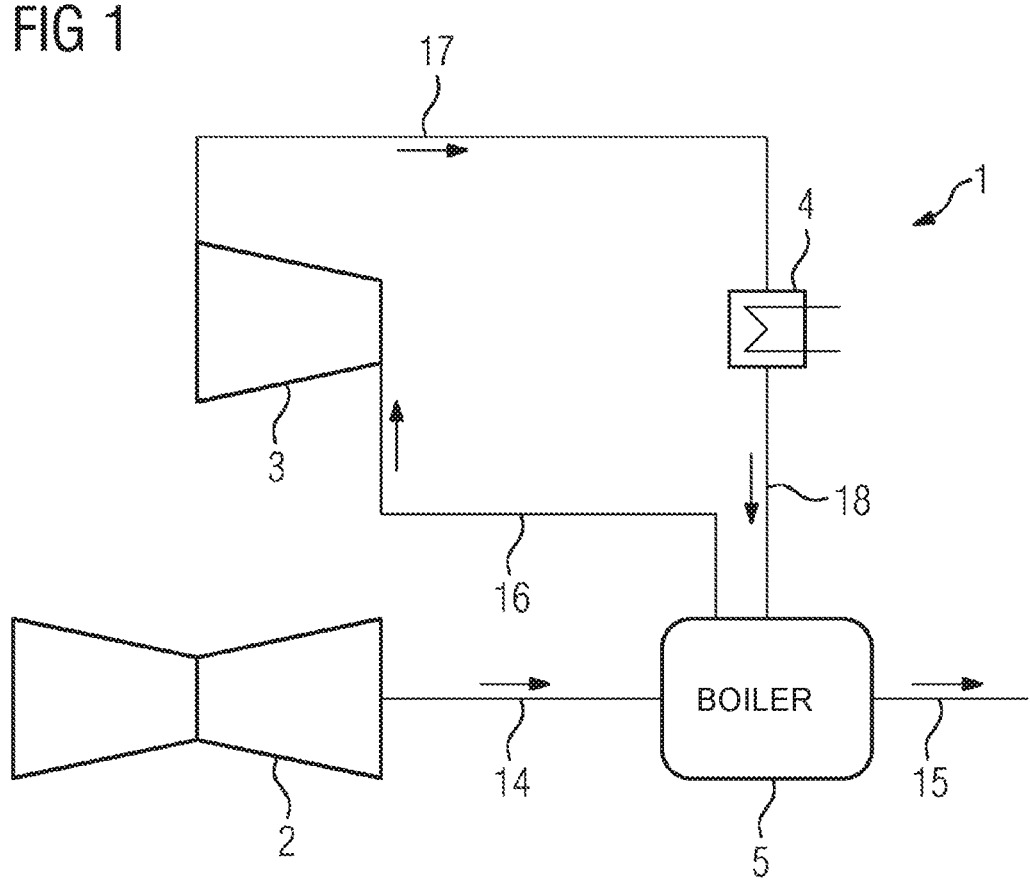
FIG. 1 shows a schematic representation of a combined cycle power plant.

Reference is first made to FIG. 1.

In FIG. 1, a combined cycle power plant 1 is represented.

The combined cycle power plant 1 has in the present exemplary embodiment a gas turbine 2, a steam turbine 3, a condenser 4 and a boiler 5.

The combined cycle power plant 1 may be designed as a multi-shaft plant, in which the gas turbine 2 and the steam turbine 3 respectively drive a generator (not represented). Alternatively, the combined cycle power plant 1 may also be designed as a single-shaft plant, in which the gas turbine 2 and the steam turbine 3 and also a generator are on a common shaft, with a self-synchronizing overrunning clutch for decoupling being additionally provided.

In normal operation, air and fuel are fed to the gas turbine 2. The hot exhaust gases of the gas turbine 2 are fed via an exhaust-gas line 14 to the boiler 5 for generating steam and are discharged via an outlet 15. Steam from the boiler 5 is fed via a steam line 16 to the steam turbine 3 and is expanded there. Via a further steam line 17, the expanded steam is fed to the condenser 4, from which condensate is then fed to the boiler 5 via a condensate line 18.

Figure 2:
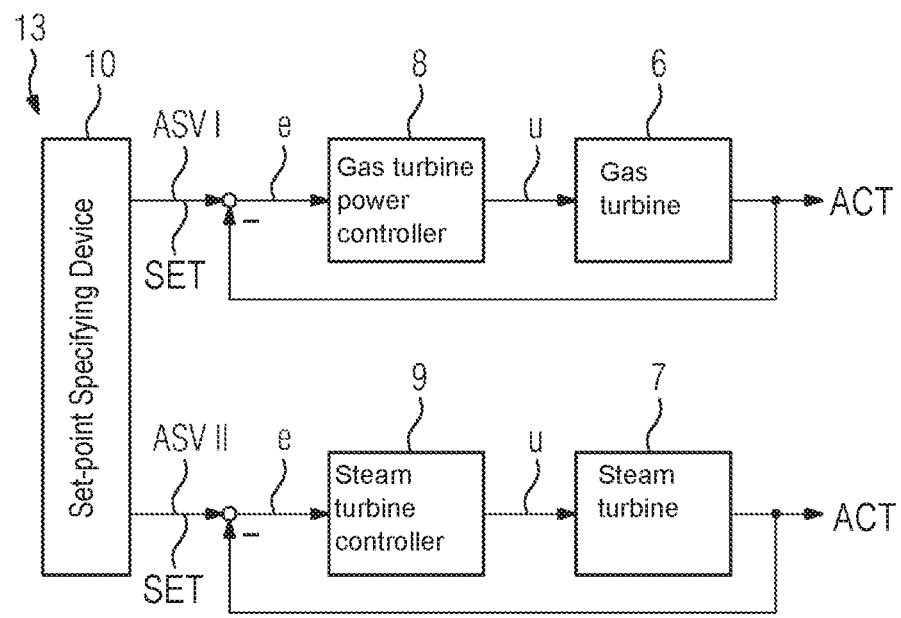
FIG. 2 shows a schematic representation of a controller structure for the combined cycle power plant represented in FIG. 1.

Reference is now additionally made to FIG. 2.

It shows a controller structure for the combined cycle power plant 1 represented in FIG. 1.

The controller structure has a gas-turbine power controller 8 and a steam-turbine power controller 9, where the gas-turbine power controller 8 is assigned to the gas turbine 2, which is symbolized in FIG. 2 by the controlled-system gas turbine 6. The steam-turbine power controller 9 is assigned to the steam turbine 3, which is symbolized in FIG. 2 by the controlled-system steam turbine 7.

As known per se. the output variable of the gas turbine 2 and of the steam turbine 3 is detected as a respective actual value ACT, a control difference is determined from a respective setpoint value SET and actual value ACT and is fed as a system deviation e to the respective gas-turbine power controller 8 and steam-turbine power controller 9. The respective gas-turbine power controller 8 and steam-turbine power controller 9 then transmits a respective manipulated variable u, to which the respective controlled-system gas turbine 6 and controlled-system steam turbine 7 is subjected, in order to ensure a desired power output.

During a shutting-down process, a shutting-down device 13 becomes active. In the exemplary embodiment represented in FIG. 2, the shutting-down device 13 is designed as a setpoint-specifying device 10.

The shutting-down device 13 transmits a shutting-down setpoint-value profile ASV I for the gas turbine 2 and a shutting-down setpoint-value profile ASV II for the steam turbine 3 as respective setpoint values to the gas-turbine power controller 8 and steam-turbine power controller 9. In this case, the shutting-down setpoint-value profile ASV I for the gas turbine 2 and the shutting-down setpoint-value profile ASV II for the steam turbine 3 comprise in the present exemplary embodiment in each case a series of values of decreasing magnitude that are coordinated with one another and transmitted to the gas-turbine power controller 8 and steam-turbine power controller 9 one after the other (e.g. after a respective predetermined time period has elapsed), in order that the gas turbine 2 and the steam turbine 3 are shut down substantially at the same time and/or at the same time t1 (see FIG. 5).

Figure 3:
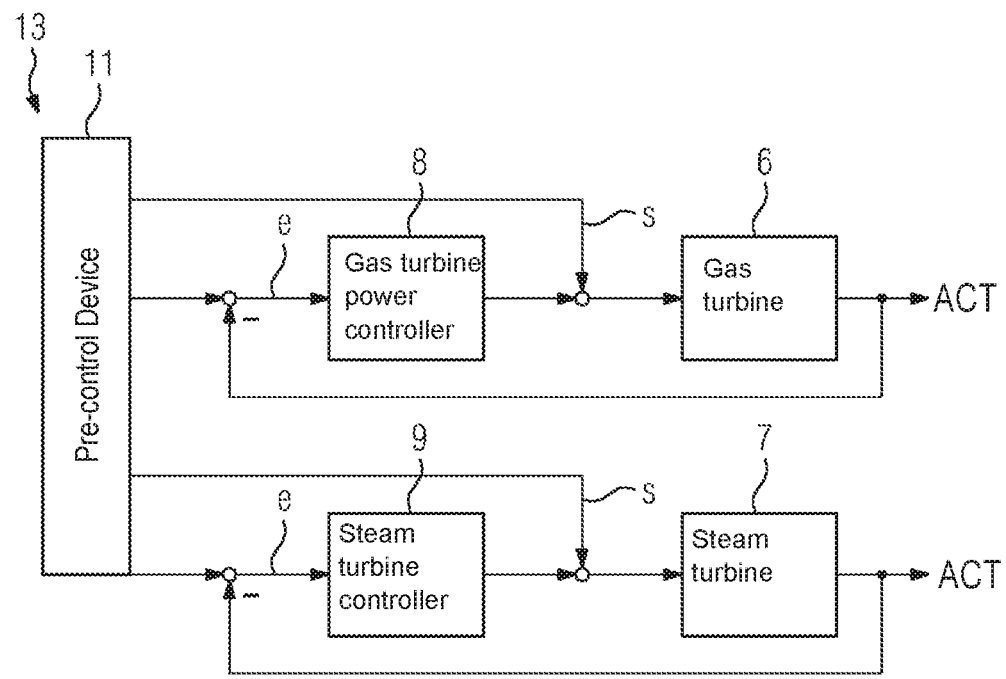
FIG. 3 shows a schematic representation of a further controller structure for the combined cycle power plant represented in FIG. 1.

Reference is now additionally made to FIG. 3.

It shows a further controller structure for the combined cycle power plant 1 represented in FIG. 1.

The controller structure represented in FIG. 3 has a shutting-down device 13, which in the present exemplary embodiment may also be designed as a pre-control device 11.

As a result of its respective shutting-down setpoint-value profile ASV I, ASV II, the shutting-down device 13 also transmits a shutting-down pre-control profile AVV I for the gas turbine 2 and a shutting-down pre-control profile AVV II for the steam turbine 3 as respective actuating values s directly to the gas turbine 2 or the controlled-system gas turbine 6 and the steam turbine 3 or the controlled-system steam turbine 7. In this case, the shutting-down pre-control profile AVV I for the gas turbine 2 and the shutting-down pre-control profile AVV II for the steam turbine 3 comprise in the present exemplary embodiment in each case a series of values of decreasing magnitude that are coordinated with one another and transmitted one after the other, in order that the gas turbine 2 and the steam turbine 3 are shut down substantially at the same time t1 (see FIG. 5).

Figure 4:
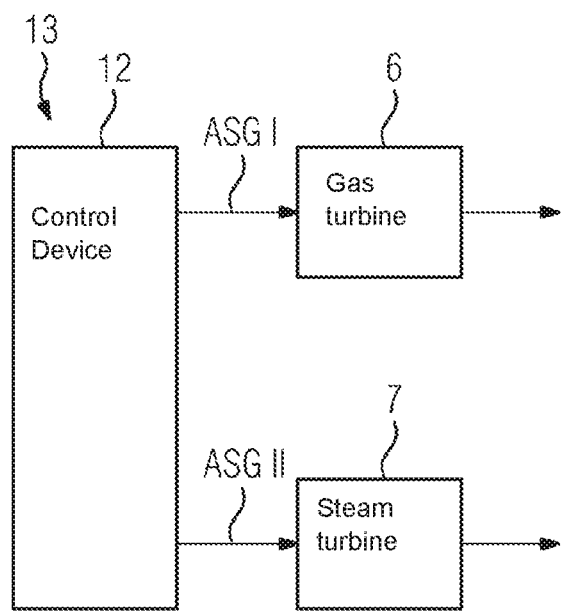
FIG. 4 shows a schematic representation of a control structure for the combined cycle power plant represented in FIG. 1.

Reference is now additionally made to FIG. 4.

It shows a further control structure for the combined cycle power plant 1 represented in FIG. 1.

The control structure represented in FIG. 4 has a shutting-down device 13, which in the present exemplary embodiment is designed as a control device 12 for controlling the gas turbine 2 and for controlling the steam turbine 3.

Figure 5:
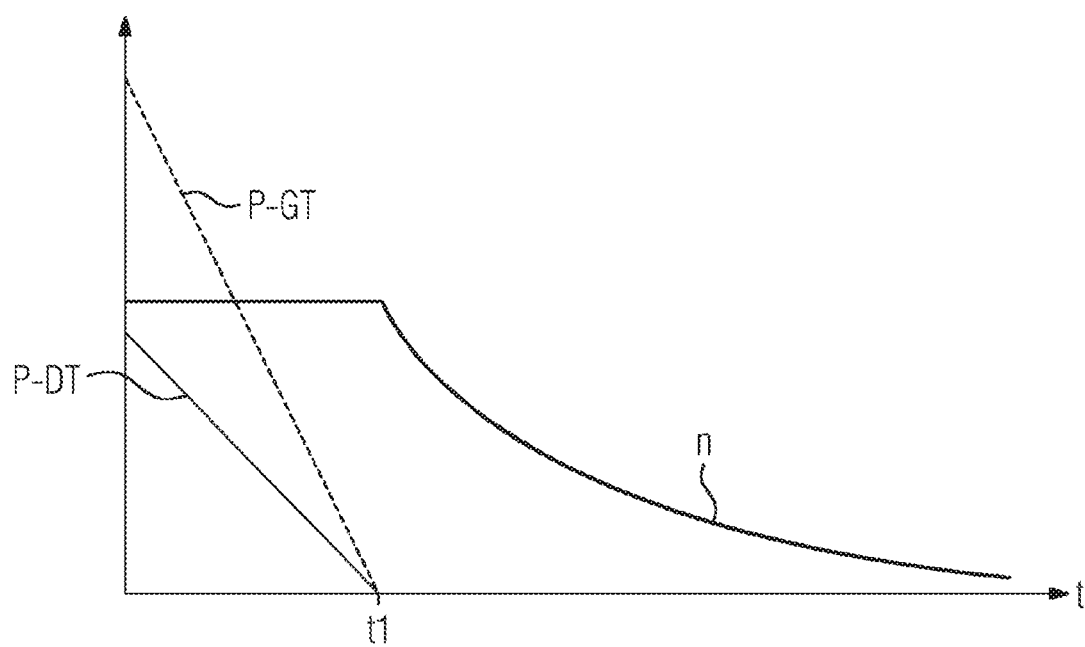
FIG. 5 shows a schematic representation of the rotational-speed and output-power profile of the combined cycle power plant represented in FIG. 1 during shutting down.

The shutting-down device 13 transmits the shutting-down manipulated-variable profile ASG I to the gas turbine 2 or the controlled-system gas turbine 6 and a shutting-down manipulated-variable profile ASG II to the steam turbine 3 or the controlled-system steam turbine 7, in order that the gas turbine 2 and the steam turbine 3 are shut down substantially at the same time t1 (see FIG. 5).

Reference is now additionally made to FIG. 5.

It shows the rotational-speed profile n and the output-power profile P of the combined cycle power plant 1 in a schematic form.

A shutting-down process begins at the time t0. Consequently, at the time t0 the shutting-down device 13 becomes active.

If the shutting-down device 13 is designed as a setpoint-specifying device 10, the shutting-down device 13 transmits the shutting-down setpoint-value profile ASV I for the gas turbine 2 and the shutting-down setpoint-value profile ASV II for the steam turbine 3 as respective setpoint values to the gas-turbine power controller 8 and steam-turbine power controller 9, in order that the gas turbine 2 and the steam turbine 3 are shut down substantially at the same time t1.

If the shutting-down device 13 is designed as a pre-control device 11, the shutting-down device 13 transmits a shutting-down pre-control profile AVV I for the gas turbine 2 and a shutting-down pre-control profile AVV II for the steam turbine 3 as respective actuating values directly to the gas turbine 2 or the controlled-system gas turbine 6 and the steam turbine 3 or the controlled-system steam turbine 7, in order that the gas turbine 2 and the steam turbine 3 are shut down substantially at the same time t1.

If the shutting-down device 13 is designed as a control device 12, the shutting-down device 13 transmits a shutting-down manipulated-variable profile ASG I to the gas turbine 2 or the controlled-system gas turbine 6 and a shutting-down manipulated-variable profile ASG II to the steam turbine 3 or the controlled-system steam turbine 7, in order that the gas turbine 2 and the steam turbine 3 are shut down substantially at the same time t1.

This allows the gas turbine 2 to be shut down at the same time as the steam turbine 3 within a time window that extends from the time t0 to the time t1, i.e. from the beginning of the shutting-down procedure to the falling of the steam temperature to a lower limit value.

Furthermore, the output-power profile P falls to zero within the time window between the times t0 and t1.

This allows the shutting down to be sped up. It is of advantage here, but not a prerequisite, that the gas turbine 2 has high dynamics.

Although the invention has been illustrated more specifically and described in detail by the preferred exemplary embodiment, the invention is not restricted by the examples disclosed and other variations may be derived therefrom by a person skilled in the art without departing from the scope of protection of the invention.

The invention claimed is:

1. A method for shutting down a combined cycle power plant, wherein the combined cycle power plant comprises a gas turbine and a steam turbine, the method comprising:

operating the gas turbine and the steam turbine within a time window that extends from a first time to a second time;

beginning a shutdown procedure of the combined cycle power plant at the first time;

decreasing a steam temperature during the time window such that the steam temperature reaches a lower limit value at the second time;

decreasing an output power of the gas turbine at the first time;

decreasing an output power of the steam turbine at the first time;

ceasing operation of the gas turbine at the second time such that the output power of the gas turbine is zero at the second time;

ceasing operation of the steam turbine at the second time such that the output power of the steam turbine is zero at the second time;

wherein ceasing operation of the gas turbine and ceasing operation of the steam turbine reduces an output power of the combined cycle power plant to zero.

* * * * *